(No Model.)   4 Sheets—Sheet 1.

G. A. FARRALL.
BEET HARVESTER.

No. 499,782. Patented June 20, 1893.

Witnesses:
Emil Neuhart.
Friedrich, Gustav, Wilhelm

Geo. A. Farrall
Inventor.
By Wilhelm Bonner
Attorneys (No Model.)  
4 Sheets—Sheet 2.

G. A. FARRALL.
BEET HARVESTER.

No. 499,782. Patented June 20, 1893.

Witnesses:  
Emil Neuhart.  
Friedrich, Gustav, Wilhelm

Geo. A. Farrall Inventor  
By Wilhelm Bonner  
Attorneys (No Model.) 4 Sheets—Sheet 3.
G. A. FARRALL.
BEET HARVESTER.
No. 499,782. Patented June 20, 1893.
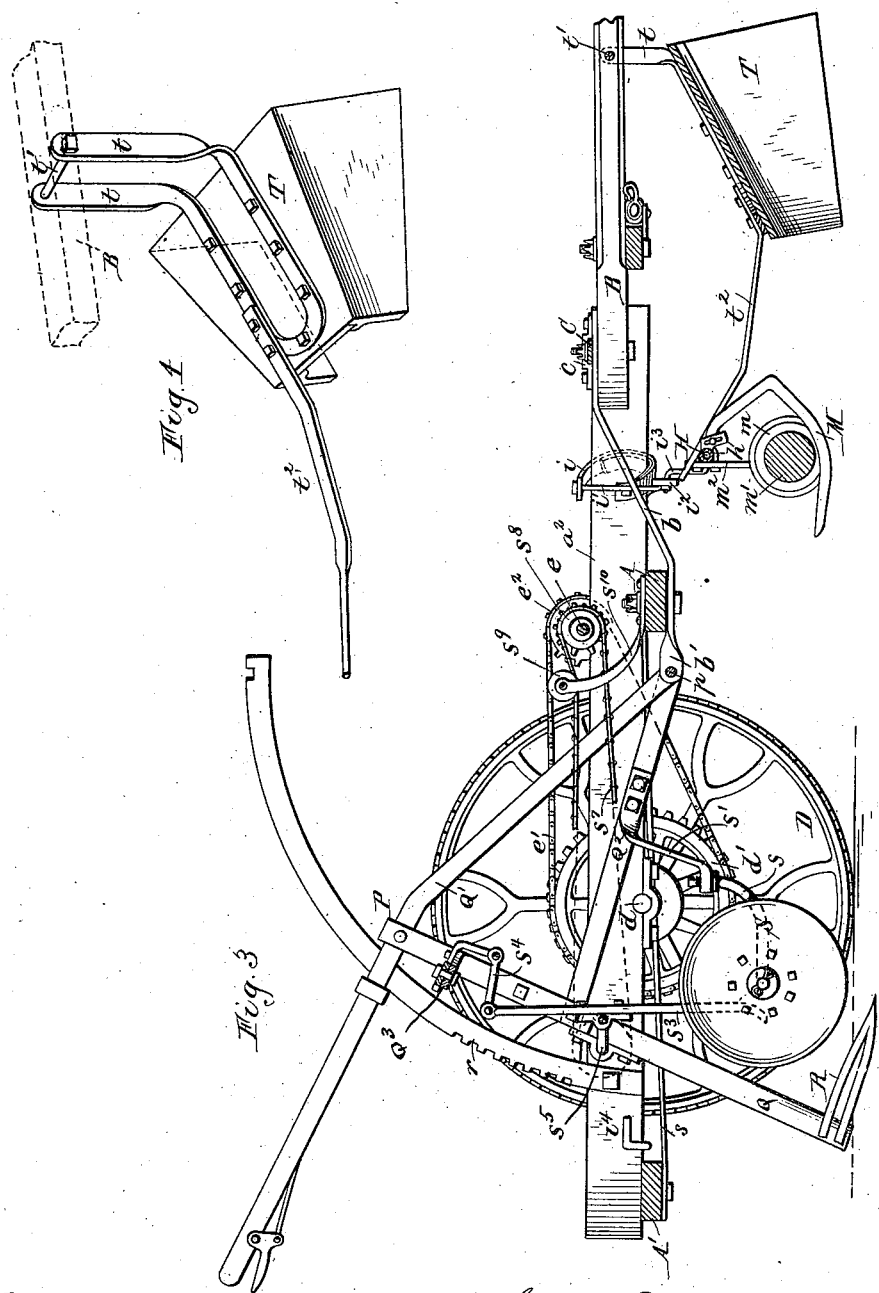
Witnesses:
Emil Neuhart
Friedrich Gustav Wilhelm
Geo. A. Farrall, Inventor
By Wilhelm & Bonner
Attorneys.

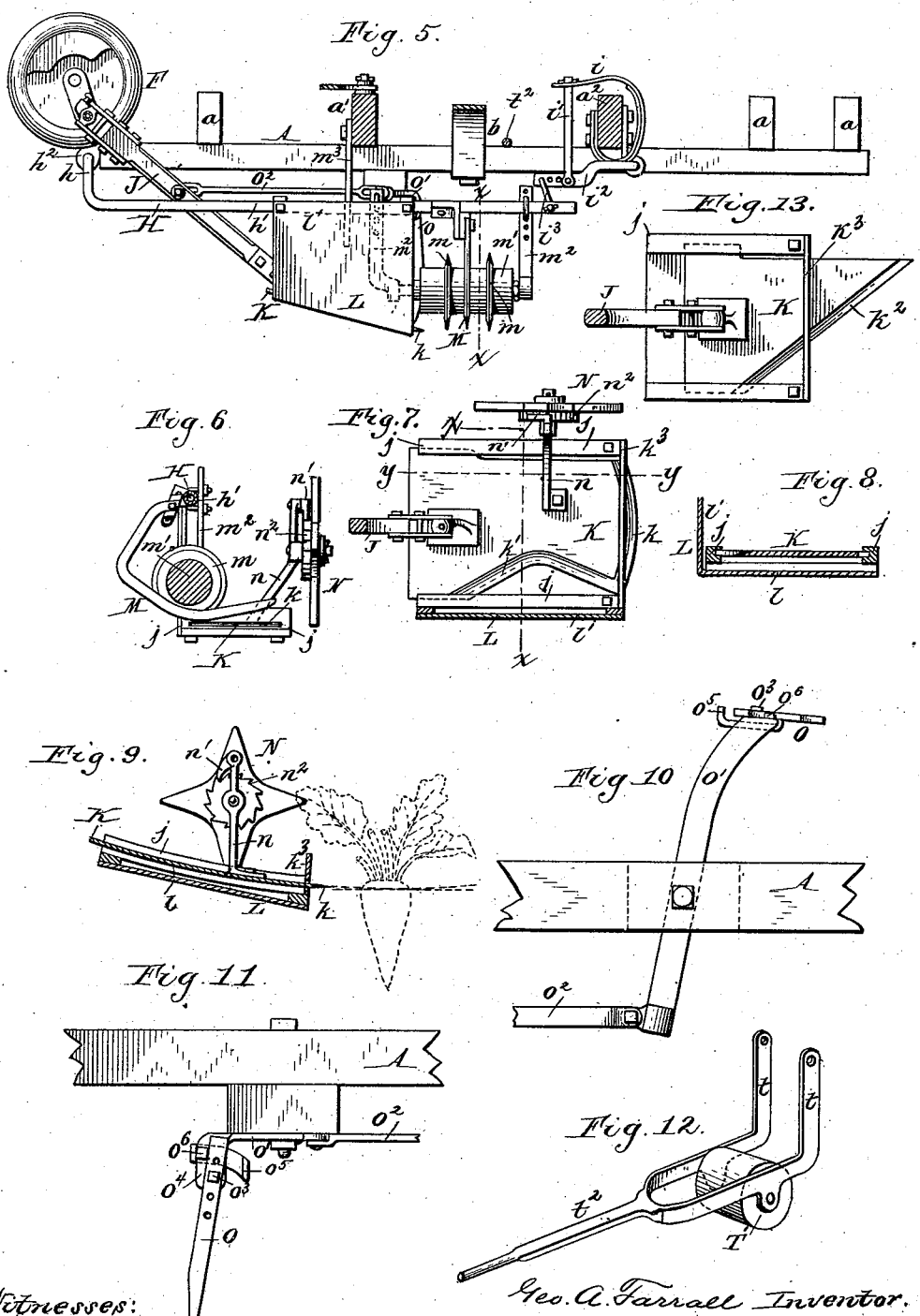

UNITED STATES PATENT OFFICE.

GEORGE ALBERT FARRALL, OF BATAVIA, NEW YORK, ASSIGNOR TO THE JOHNSTON HARVESTER COMPANY, OF SAME PLACE.

BEET-HARVESTER.

SPECIFICATION forming part of Letters Patent No. 499,782, dated June 20, 1893.

Application filed March 7, 1892. Serial No. 423,975. (No model.)

*To all whom it may concern:*

Be it known that I, GEORGE ALBERT FARRALL, a citizen of the United States, residing at Batavia, in the county of Genesee and State of New York, have invented new and useful Improvements in Beet-Harvesters, of which the following is a specification.

My invention relates to a machine which is designed for harvesting sugar beets and which first cuts the tops off the beets and then digs the beets out of the ground.

Figure 1:
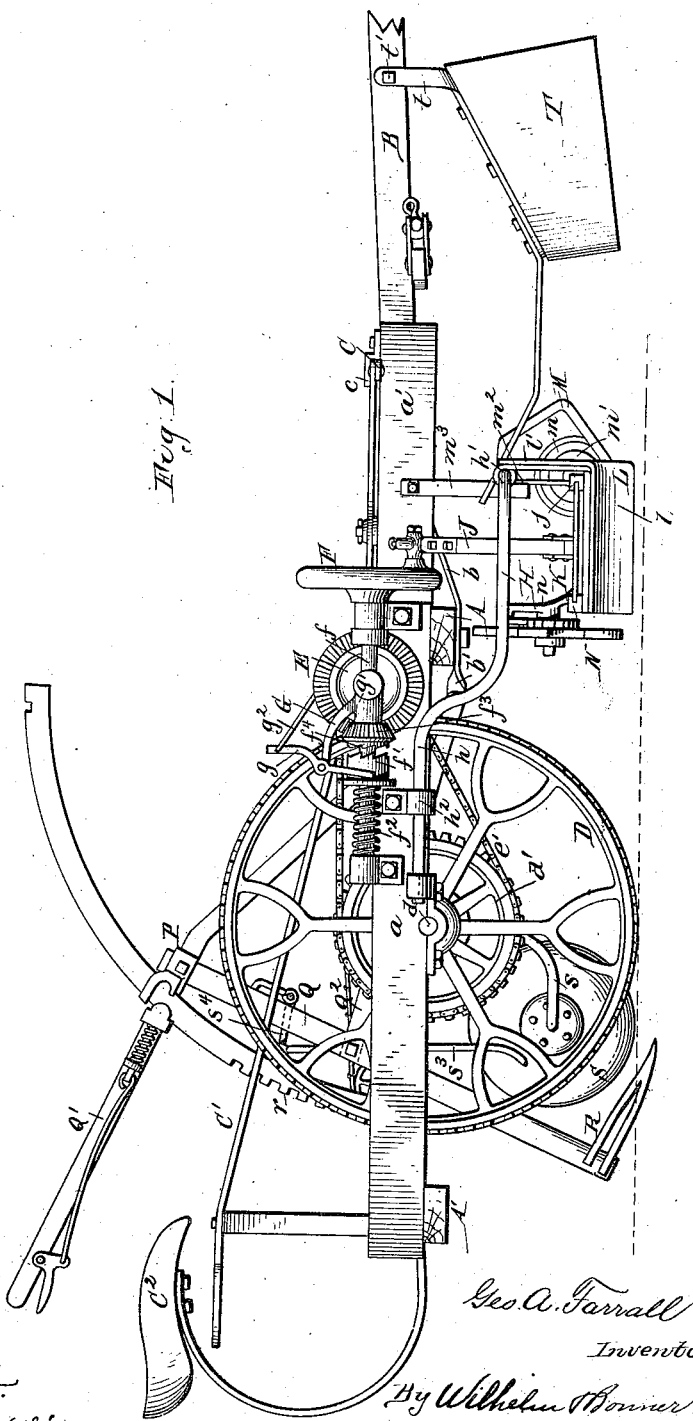
Figure 2:
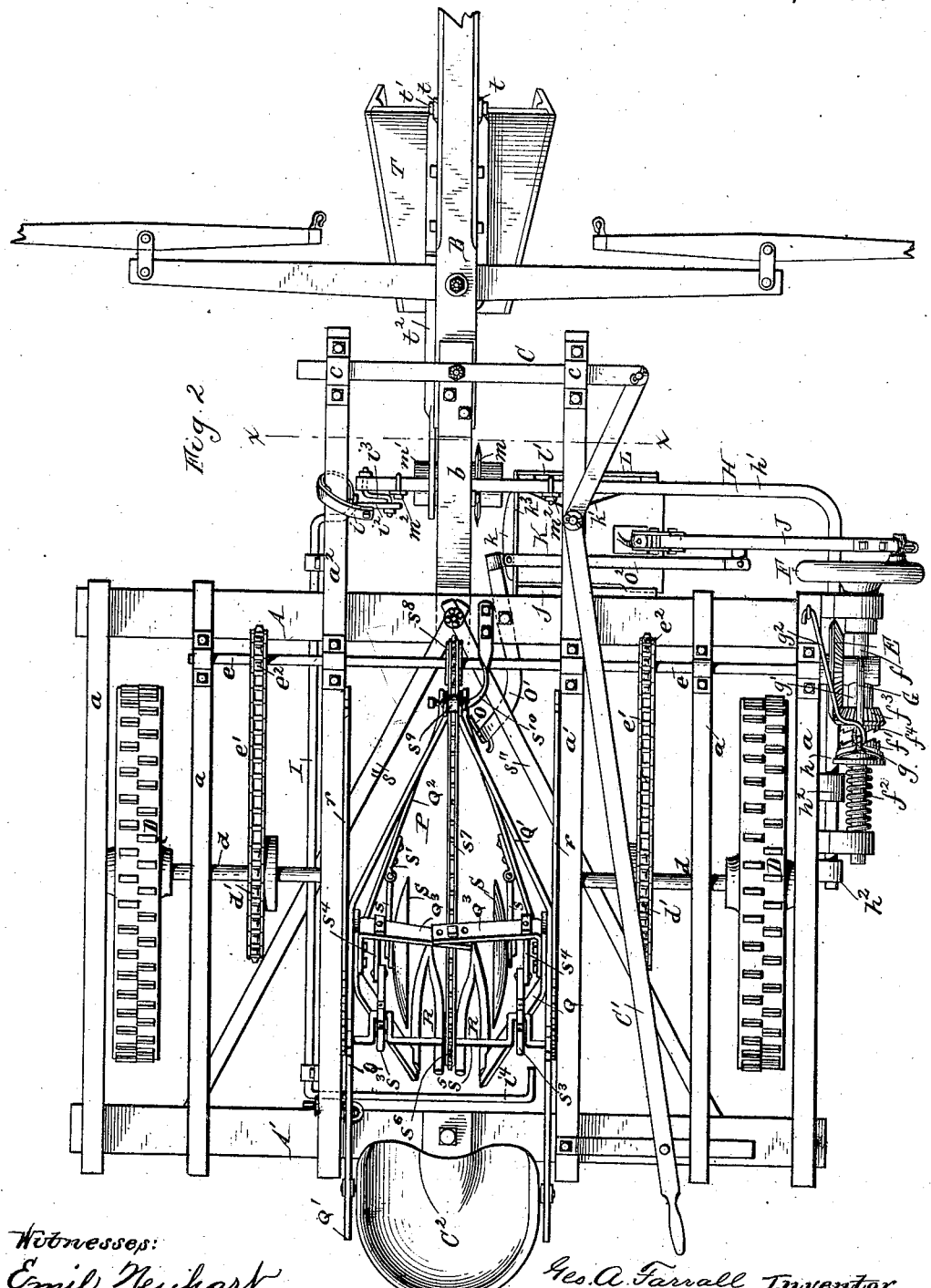

In the accompanying drawings consisting of four sheets:—Figure 1 is a side elevation of my improved machine. Fig. 2 is a top plan view thereof. Fig. 3 is a longitudinal section thereof. Fig. 4 is a perspective view of the hood for brushing down the tops of the beets. Fig. 5 is a front elevation of the cutter mechanism with the frame in a cross section taken in line $x$—$x$, Fig. 2. Fig. 6 is a longitudinal section of the gage mechanism in line $x$—$x$, Fig. 5. Fig. 7 is a top plan view of the cutter and its guides, partly in section. Fig. 8 is a cross section thereof in line $x$—$x$, Fig. 7. Fig. 9 is a longitudinal section thereof in line $y$—$y$, Fig. 7. Fig. 10 is a top plan view of the rear clearing finger and connecting parts. Fig. 11 is a rear elevation thereof. Fig. 12 is a perspective view of the roller which may be used for brushing down the tops. Fig. 13 is a top plan view showing a modified form of the cutter.

Like letters of reference refer to like parts in the several figures.

The frame of the machine consists essentially of a front cross bar A, a rear cross bar A', two pairs of longitudinal side bars $a$, and a pair of inner longitudinal bars $a'$ $a^2$. The latter extend forwardly beyond the front cross bar A.

B represents the tongue provided with a rear portion $b$ which is preferably made of metal. This rear portion is bent downwardly and pivoted to the under side of the front cross bar A at the middle of the latter, and terminates behind said pivot in a vertical ear $b'$.

C is a sliding bar which is arranged transversely upon the front portions of the inner longitudinal bars $a'$ $a^2$, which latter are provided with straps $c$ in which the bar slides. This bar is attached to the tongue in front of its pivot, so that by moving the bar in its ways the tongue is swung on its pivot to the right or left. This enables the operator to guide the machine in following short crooks in the rows. The transverse rear bar is shifted by a hand lever C' which is pivoted to the inner longitudinal bars $a'$ and which has its handle in convenient reach of the operator who occupies the seat $C^2$.

D represents the ground wheels upon which the machine runs, and which are arranged between the side bars $a$.

$d$ represents the axles upon which the ground wheels are mounted and which extend inwardly to the inner longitudinal bars $a'$ $a^2$, which latter carry journals in which the inner ends of the axles turn. The two side bars on opposite sides of the same wheel are separated a sufficient distance to permit each ground wheel to be shifted lengthwise upon its axle whereby the distance between the ground wheels can be increased or decreased as may be necessary to cause the wheels to properly run between the rows of plants.

$d'$ represents sprocket wheels mounted upon the axles by means of ratchet devices of ordinary construction, which cause the sprocket wheels to be turned by the forward rotation of the ground wheels, but permit each ground wheel to turn backwardly without turning its sprocket wheel.

$e$ represents a transverse shaft arranged on the front portion of the main frame and driven from the sprocket wheels $d'$ by drive chains $e'$ running around said sprocket wheels, and smaller sprocket wheels $e^2$ secured to the transverse shaft. The latter is provided at one end with a bevel wheel E.

$f$ represents the shaft of the cutter mechanism arranged longitudinally on the outer side of the bevel wheel E and provided at its front end with a crank wheel F and on its rear portion with a clutch sleeve $f'$ which slides on a feather in the shaft and is pressed forward by a spring $f^2$.

$f^3$ represents a bevel pinion which meshes with the bevel wheel E and is mounted on a hollow shaft which turns loosely on the shaft $f$. The bevel pinion is provided on its rear side with a clutch face $f^4$ with which the clutch sleeve is engaged by the spring and whereby motion is transmitted from the transverse shaft e to the longitudinal shaft f. The clutch sleeve can be disengaged from the bevel pinion by a lever g which has its fulcrum on an arm G formed on a bearing $g'$ in which the hollow shaft turns. When it is desired to stop the rotation of the cutter shaft, this lever is shifted to disengage the clutch coupling and locked in this position by a hook $g^2$ engaging with an eye on the main frame.

H represents a pivoted elbow bar by which the cutter mechanism and the gage mechanism are supported. This bar is composed of an outer portion $h$ arranged lengthwise of the machine underneath the cutter shaft, and a transverse portion $h'$ which extends inwardly from the front end of the outer portion and terminates underneath the inner bar $a^2$ of the main frame. The outer portion of this supporting bar is pivoted with its rear end in longitudinal sockets $h^2$ whereby the transverse portion of the bar is enabled to swing vertically. The free end of this supporting bar is carried by a spring $i$ which is secured to the bar $a^2$ and has its free end connected by a rod $i'$ with an arm $i^2$ arranged underneath the bar $a^2$ and connected with the free end of the transverse supporting bar by a hook or link $i^3$, Fig. 5. The arm $i^2$ is provided with a series of holes in any one of which the lower end of the rod $i'$ can be engaged and whereby the effective upward pressure of the spring can be regulated so as to carry a greater or less proportion of the weight which is supported by the transverse bar. When the growth is rank, the spring is adjusted to carry less of the weight, and when the growth is light, the spring is adjusted to carry a greater portion of the weight. The arm $i^2$ is formed at the front end of a longitudinal shaft I which is journaled in bearings secured to the bar $a^2$. This shaft is provided at its rear end with an inwardly projecting foot-lever $i^4$ which the driver can depress with his foot, and whereby the transverse supporting bar and the parts attached thereto, can be depressed at the will of the driver, for instance when it is desired to cut an unusually low or thick top beet.

J represents the pitman which is attached with its outer end to the wrist pin of the crank wheel F and extends inwardly to the reciprocating cutter blade K which slides between guides $j$. The latter are secured to the lower horizontal portion $l$ of an angle plate L which is secured with the upper end of its vertical front portion $l'$ to the pivoted supporting bar H. The guides incline inwardly and the cutter and guides are curved in the direction of their length or transversely of the machine, as represented in Fig. 9, so that as the cutter is moved inwardly, the curvature of the guides will cause its edge to move through the lower portion of an arc which is approximately horizontal. The outer ends of the guides are elevated because the crank wheel is arranged above the plane of the cutter. This would produce an oblique cut, and in order to avoid this and produce an approximately horizontal cut, the guides and cutter are curved in the arc of a circle turned with its convex side downward and having its center nearly over the inner ends of the guides $j$, so that the sweep of the cutting edge takes place in the arc of a circle which is not far out of a horizontal line.

The inner edge $k$ of the cutter, Fig. 7, is arranged lengthwise of the machine and is made slightly convex. This edge cuts during the forward movement of the cutter. In order to enable the cutter to cut also on the return stroke, the front edge $k'$ of the cutter, which edge is arranged transversely of the machine, has the form of a hollow receding angle or concave, forming a V-shaped cutting edge, the outer portion of which cuts on the return stroke and severs that portion of the beet which has remained uncut during the forward stroke. The inner front corner of the knife in advancing cuts a slit into the beet into which the knife moves as the machine is drawn forward and the concave front edge of the knife completes the cut on the return stroke. If desired, the cutter blade may be provided with an oblique cutting edge $k^2$ which extends from the front side to the rear side of the blade as represented in Fig. 13, and which is so long as to extend across the row of beets in all positions of the blade, which latter is operated with a rather short stroke. $k^3$ represents a scraper bar which is secured to the guides above the inner portion of the cutter.

M, Figs. 1, 3, 5 and 6, represents a gage bar or shoe which regulates the depth of cut by riding on the tops of the beets and which remains resting thereon until the top has been cut off. This gage consists of a bar which is curved upwardly at its front and attached with its upper front end to the transverse supporting bar and which extends rearwardly from its curved front portion toward the rear end of the knife. This bar is comparatively narrow and therefore works its way through the leaves on top of the beet and rides upon the solid top. The main portion, which forms the foot or runner of the bar, is arranged at a suitable height above the cutter so that the cut is effected at the desired height below the top of the beet. The upper front end of the gage bar is adjustably attached to the transverse supporting bar H by a slot and screw bolt, as represented in Figs. 3 and 6, or other suitable means, to adjust the height of the bar to the condition of the crop. In order to prevent this gage bar from running off the beet on either side, a narrow gage-roller $m$ is arranged on each side of the bar. These rollers also run on the top of the beet and are secured to a spool $m'$ which is journaled in hangers $m^2$ secured to the transverse supporting bar. The lower edges or faces of the gage rollers are on a level with the lower face of the gage bar. In order to prevent the transverse bar from being sprung backward by the pressure against the front of the gage and cutter mechanisms, a stop $m^3$ is secured to the frame bar $a'$ in such a position as to bear against the rear side of the transverse bar, Figs. 1 and 5. The supports of the gage rollers are adjustably attached to the supporting bar so that the rollers can be adjusted to correspond with the gage bar.

N, Figs. 7 and 9, represents a star shaped clearing wheel which is supported on the cutter and brushes away, during the forward stroke, the leaves which have been cut off and have fallen near the cutter. This star wheel is arranged transversely in rear of the cutter and pivoted to a bracket $n$ attached to the upper side of the cutter.

$n'$ represents a pawl which is pivoted upon the bracket $n$ and engages with a ratchet rim $n^2$ formed on the hub of the star wheel, thereby holding the star wheel against rotation during the forward stroke of the cutter but permitting the same to rotate on its return stroke. This causes the lower tooth of the star wheel to remain rigidly in an operative position during its forward stroke for the purpose of clearing away the cut leaves and permits the star wheel to rotate during its return stroke whereby the wheel is prevented from dragging back the cut leaves.

O, Figs. 2, 10 and 11, represents a clearing finger which is arranged at a greater distance in rear of the knife and which brushes the leaves away during the backward stroke of the knife. This finger is attached to the rear end of a horizontal rock lever $O'$ which is pivoted to the under side of the front cross bar A of the main frame and actuated by a transverse rod $O^2$ connecting it with the pitman of the cutter. The finger O is pivoted by a bolt $O^3$ to a depending ear $O^4$ formed on the rock lever $O'$. This ear is provided with stops $O^5$ $O^6$ against which the upper end of the finger bears and which allow the finger to assume a position more nearly perpendicular during its effective forward stroke than during its return stroke.

P represents the digger-frame which is arranged between the inner longitudinal bars $a'$ $a^2$ of the main frame and which carries the digging implements. This frame is pivoted to the upright ear $b'$ at the rear end of the tongue, by a horizontal bolt $p$. This bolt exceeds somewhat in length the width of the parts which are attached to it, so that sufficient play is afforded for shifting the tongue on its pivot, so that the frame can be raised and lowered in the main frame. The digger frame consists of two side parts each composed of an upright bar Q, a handle bar $Q'$ which extends from the pivot $p$ rearwardly past the upper end of the upright bar Q to the vicinity of the seat, and a brace $Q^2$ which extends from said pivot to the upright bar below the upper end thereof. The front portion of the handle bar and the brace converge forwardly in each side part of the digger frame and the two side parts also converge forwardly.

R represents diggers which are attached to the lower ends of the upright bars Q and which point forwardly in a downwardly inclined position so as to enter the ground and dig up the beets.

S represents colter disks which are attached to the digger frame above the diggers for the purpose of cutting and removing the leaves in advance of the diggers. Each of these disks is journaled upon the rear end of a draft rod $s$ which latter is curved upwardly with its front end and pivoted to the lower end of a depending bracket $s'$ secured to the brace $Q^2$ thereby permitting the disks to freely adjust themselves to the line of draft.

$s^3$ represents upright clearing arms whereby the accumulation of ground upon the diggers is prevented especially when the ground is wet. These clearing arms are arranged with their lower operative ends over the diggers and connected with their upper ends to a cross bar $Q^3$ of the digger frame by links $s^4$. An up and down and backward and forward movement is imparted to the clearing arms by a transverse crank shaft $s^5$ which is journaled in bearings secured to the upright bars Q and has its cranks connected with the clearing arms near their middle portions. The crank shaft is provided with a sprocket wheel $s^6$ and is driven by a drive chain $s^7$ passing around the sprocket wheel $s^6$ and a sprocket wheel $s^8$ secured to the transverse shaft $e$. The drive chain $s^7$ is held tight in the various positions of the digger frame by a tightening wheel $s^9$ mounted on a spring arm $s^{10}$ which is attached to the cross bar A.

$r$ represents notched segments which are secured to the main frame and upon which the handle bars are locked at any desired elevation, either for digging at a greater or less depth or for carrying the digging implements clear of the ground.

$s''$ $s''$ represent diagonal braces which diverge from the pivot bolt of the tongue rearwardly to the rear cross bar $A'$ of the main frame.

T represents a hood which is suspended from the tongue in front of the cutter mechanism and which serves to press down the tops of the beets before they are operated upon by the cutter mechanism. The top of this hood slopes backwardly and the sides converge backwardly whereby the tops are gathered and pressed down. This hood is suspended from the tongue by hangers $t$ arranged at the front end of the hood and a horizontal bolt $t'$ passing through the same and the tongue. The hood is provided with a rearwardly projecting supporting bar $t^2$ which rests upon the transverse supporting bar H of the cutter mechanism and rises and falls with the same. Instead of this hood a transverse roller $T'$ may be used, as represented in Fig. 12, but I prefer the hood because it gathers the tops while the roller spreads them.

I prefer to combine the top-cutting mechanism and the digging mechanism in the same machine but it is obvious that they may be used in separate machines, one of which cuts the tops and so prepares the beets for digging, and the other of which digs the beets.

I claim as my invention—

1. The combination with the cutter mechanism and the vertically movable supports to which it is attached, of a vertically movable hood arranged in advance of the cutter mechanism and supported on the vertically movable support of the cutter mechanism, substantially as set forth.

2. The combination with the cutter-mechanism and the vertically movable support to which it is attached, of a hood arranged in advance of the cutter-mechanism, hangers to which the hood is hung, and a supporting bar attached to the hood and resting upon the support of the cutter mechanism, substantially as set forth.

3. The combination with the cutter having its inner cutting edge arranged lengthwise of the machine and the transverse guides in which the cutter moves, of a longitudinal gage bar arranged inwardly beyond the inner ends of said guides, substantially as set forth.

4. The combination with the cutter-mechanism, of a gage bar connected therewith, and gage rollers arranged on opposite sides of the gage bar, substantially as set forth.

5. The combination with the wheeled main frame, of a transverse bar attached at its outer end to the main frame by a longitudinal pivot, a transversely moving cutter attached to the vertically movable inner portion of said bar, and a gage bar arranged on the inner side of the cutter, and secured with its upper end to said transverse bar and extending downwardly and rearwardly therefrom, substantially as set forth.

6. The combination with the main frame and the transverse cutter guides, of a cutter blade moving in said guides and having an inner cutting edge which is arranged lengthwise of the machine and which projects beyond the inner ends of said guides, substantially as set forth.

7. The combination with the main frame, of a transversely moving cutter having a cutting edge on its inner side, and having its front constructed with a concave cutting edge, substantially as set forth.

8. The combination with the main frame, of a transversely moving cutter curved in the direction of its movement, and similarly curved transverse guides in which the cutter moves, substantially as set forth.

9. The combination with the transversely moving cutter, of a clearing device secured thereto and moving back and forth therewith, substantially as set forth.

10. The combination with the transversely moving cutter, of a star wheel pivoted upon said cutter and held against rotation during its forward stroke but free to rotate during its return stroke, substantially as set forth.

11. The combination with the transversely moving cutter provided with a bracket on its rear end, of a star wheel pivoted on said bracket and provided with a ratchet rim and a pawl pivoted on said bracket and engaging with said rim, substantially as set forth.

12. The combination with the main frame and the transversely moving cutter, of a rock arm pivoted to the main frame and actuated by the cutter mechanism, and a clearing finger secured to said rock arm, substantially as set forth.

13. The combination with the main frame, of a transverse supporting bar attached at its outer end to the main frame by a longitudinal pivot, transverse guides supported on said bar, a longitudinal gage bar attached to said bar beyond the inner ends of said guides, and an adjustable spring connecting the inner end of said bar with the main frame and supporting a greater or less portion of the weight of the bar and connecting parts, substantially as set forth.

14. The combination with the main frame, of a digger frame pivoted upon said frame and capable of vertical adjustment, an adjusting segment secured to the main frame and a locking device whereby the digger frame is secured on the segment in its adjusted position, substantially as set forth.

15. The combination with the main frame and the transversely moving cutter attached thereto, of a tongue connected with the main frame by a vertical pivot, a shifting device whereby the tongue can be swung laterally on the main frame, and a digger frame attached to the rear end of the tongue, substantially as set forth.

Witness my hand this 4th day of March, 1892.

GEORGE ALBERT FARRALL.

Witnesses:
   D. W. SPENCER,
   WARREN FARGO.